(12) United States Patent
Sun et al.

(10) Patent No.: US 8,992,063 B2
(45) Date of Patent: Mar. 31, 2015

(54) LIGHT EMITTING DIODE PACKAGE UNIT, METHOD FOR MANUFACTURING THE SAME AND BACKLIGHT

(75) Inventors: Haiwei Sun, Beijing (CN); Jia Liu, Beijing (CN); Site Cai, Beijing (CN)

(73) Assignee: Beijing Boe Optoelectronics Technology Co., Ltd., Beijing (CN)

( * ) Notice: Subject to any disclaimer, the term of this patent is extended or adjusted under 35 U.S.C. 154(b) by 610 days.

(21) Appl. No.: 13/241,925

(22) Filed: Sep. 23, 2011

(65) Prior Publication Data

US 2012/0075840 A1    Mar. 29, 2012

(30) Foreign Application Priority Data

Sep. 27, 2010    (CN) .......................... 2010 1 0294536

(51) Int. Cl.
*F21V 7/04*    (2006.01)
*G02B 19/00*    (2006.01)
*F21V 8/00*    (2006.01)

(52) U.S. Cl.
CPC ............ *G02B 19/0009* (2013.01); *G02B 6/003* (2013.01); *G02B 6/0068* (2013.01); *G02B 6/0073* (2013.01); *G02B 6/009* (2013.01); *G02B 19/0014* (2013.01); *G02B 19/0061* (2013.01)
USPC .......................................... 362/608; 362/612

(58) Field of Classification Search
CPC ................... G02F 1/133615; G02F 1/133603; G02F 2001/133317; G02F 2001/133628; G02F 1/133308; G02F 1/133606; G02F 2001/133314; G02F 1/133; G02F 1/133605; G02F 2001/133325; G02F 2001/133607; G02F 2001/13
USPC ..................................................... 362/608, 612
See application file for complete search history.

(56) References Cited

U.S. PATENT DOCUMENTS

| 6,568,822 | B2 * | 5/2003 | Boyd et al. ...................... 362/621 |
| 8,459,860 | B2 * | 6/2013 | Saito .............................. 362/621 |
| 2006/0267037 | A1 | 11/2006 | Lim et al. |
| 2006/0285332 | A1 | 12/2006 | Goon et al. |
| 2010/0202131 | A1 * | 8/2010 | Kim et al. ..................... 362/97.1 |

FOREIGN PATENT DOCUMENTS

| CN | 1909258 | A | 2/2007 |
| CN | 101345236 | A | 1/2009 |
| CN | 101430072 | A | 5/2009 |
| CN | 101561115 | A | 10/2009 |
| CN | 101649992 | A | 2/2010 |

OTHER PUBLICATIONS

3rd Chinese Office Action dated Aug. 15, 2013; Appl. No. 201010294536.0.
First Chinese Office Action; Application No. 201010294536.0; dated Jan. 11, 2013.
Fourth Chinese Office Action dated Feb. 7, 2014; Appln. No. 201010294536.0.

* cited by examiner

*Primary Examiner* — William Carter
(74) *Attorney, Agent, or Firm* — Ladas & Parry LLP

(57) ABSTRACT

A light emitting diode package unit, a method for manufacturing the same and a backlight are disclosed. The light emitting diode package unit comprising a LED chip and a light uniformization structure formed above the LED chip in the direction of exiting light.

11 Claims, 6 Drawing Sheets

LIGHT EMITTING DIODE PACKAGE UNIT, METHOD FOR MANUFACTURING THE SAME AND BACKLIGHT

BACKGROUND

Embodiments of the disclosed technology relate to a light emitting diode package unit, a method for manufacturing the same and a backlight.

Nowadays, light emitting diodes (LEDs), due to low power consumption, long service life, high response speed and so on, are widely used. For example, a light emitting diode backlight in a liquid crystal display (LCD) is shown in FIG. 1. A plurality of LED package units 13 are disposed on a circuit board 12 at one side of a light guide plate 11. Each LED package unit 13 illuminates a local area on the edge of the light guide plate 11. Each LED package unit 13 comprises a light extraction cup 16, a LED chip 15 on the bottom of the light extraction cup 16, and a bar type package element 14 used to package the LED chip 15 in the light extraction cup 16, as shown in FIG. 2 and FIG. 3. Typically, the package element 14 is formed of epoxy resin, which may further contain fluorescent particles in different colors for mixing monochromatic light emitted from the LED package units into white light.

The disadvantages of the above described LED package unit structure are given at least as follows. As shown in FIG. 3, which depicts a partial light path view of an LED package unit of a related art, light rays 9 emitted from the LED chip 15 would be diverged when leaving the upper surface of the package element 14, since the refractive index of the package element 14 is higher that of the surrounding air. The closer the light rays 9 approaches the side parts of the package element 14, the more they deviates from the original optical paths; further, the reflectivity of the light rays becomes larger as the incident angles increase. As a result, the closer the light rays 9 approaches the side parts (i.e., the lager the incident angles are), the more the light rays 9 will be reflected back into the package element 14, and the less the light rays 9 will leave the package element 14. The light rays 9 are totally reflected when the incident angle exceeds the critical angle. In addition, the light rays 9 exiting from the side parts are subject to much energy loss because of long optical paths. As a result, the relative intensity of the exiting light rays 9 from the upper surface of the package element 14 decreases as the exiting angles (i.e., the angles between the light rays 9 exiting from the package element 14 and the vertical directions at the exiting points) increase, as shown in FIG. 4. That is, the intensity of the exiting light rays 9 exiting from the LED package unit 13 is higher in the central part and lower at both side parts, i.e., the intensity is nonuniform. As a result, the uniformity of the light emitted from the backlight is deteriorated. Although regions corresponding to the side parts of one LED package unit 13 may be irradiated by two LED package units 13, the relative intensity is still decreased to 0.4 when the exiting angle is 60°, as shown in FIG. 4. In other words, the relative intensity at the side parts can not reach the same level as that in the central parts, even though superposition of illumination occurs.

SUMMARY

An embodiment of the disclosed technology provides a light emitting diode package unit, comprising a LED chip; and a light uniformization structure formed above the LED chip along the direction of exiting light.

Another embodiment of the disclosed technology provides a backlight, comprising: a light guide plate, and at least two LED package units disposed on one side of the light guide plate, wherein at least two LED package units comprise the above-mentioned light emitting diode package unit.

Further another embodiment of the disclosed technology provides a method for manufacturing a backlight, comprising following steps: fixing a LED chip; packaging the LED chip with a packaging material; and forming a light uniformization structure above the LED chip in the direction of exiting light.

Further scope of applicability of the disclosed technology will become apparent from the detailed description given hereinafter. However, it should be understood that the detailed description and specific examples, while indicating preferred embodiments of the disclosed technology, are given by way of illustration only, since various changes and modifications within the spirit and scope of the disclosed technology will become apparent to those skilled in the art from the following detailed description.

BRIEF DESCRIPTION OF THE DRAWINGS

The disclosed technology will become more fully understood from the detailed description given hereinafter and the accompanying drawings which are given by way of illustration only, and thus are not limitative of the disclosed technology and wherein.

DETAILED DESCRIPTION

Hereinafter, embodiments will be described in detail with reference to the accompanying drawings so that the objects, technical solutions and advantages of the embodiments will become more apparent. It should be noted that the embodiments described below are merely a portion of but not all of the embodiments of the disclosed technology, and thus various modifications, combinations or alterations can be made on the basis of the described embodiments without departing from the spirit and scope of the disclosed technology.

An embodiment of the disclosed technology provides a light emitting diode package unit, comprising a LED chip and a light uniformization structure (or feature) formed above the LED chip.

With the light uniformization structure above the LED chip, the uniformity of light can be improved.

First Embodiment

Figure 5:
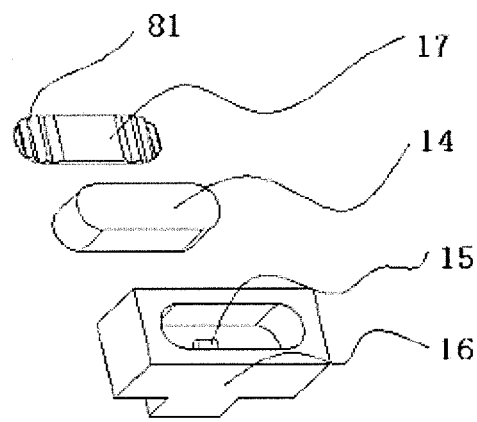
FIG. 5 is a structural schematic view showing a light emitting diode package unit in a first embodiment of the disclosed technology.
Figure 6:
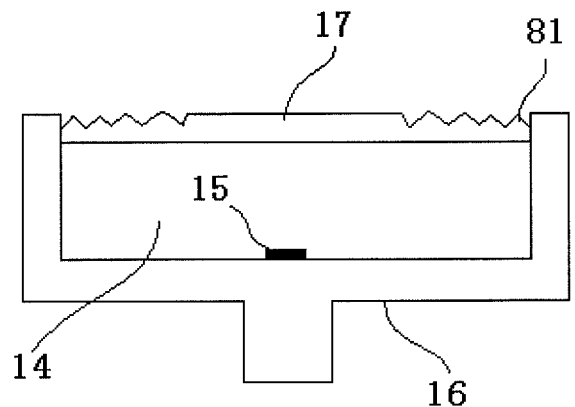
FIG. 6 is a structural schematic cross-sectional view showing a LED package unit in the first embodiment of the disclosed technology.

An embodiment of the disclosed technology provides a LED package unit, as shown in FIG. 5 and FIG. 6. This LED package unit comprises a bar type light extraction cup 16; a LED chip, located on the bottom of the light extraction cup 16; a bar type package element 14, formed of epoxy resin in which fluorescence particles may be introduced, located within the light extraction cup 16, with the LED chip 15 being located below the package element 14; and a light uniformization plate 17 formed of, e.g., polyethylene, located on the upper surface of the LED chip 14.

The light uniformization plate 17 has a thickness in a range from 0.1 mm to 0.2 mm. The light uniformization plate 17 has two side parts along its length direction (i.e., the length direction of the LED package unit). There are several triple prism columns (i.e., light uniformization structures) 81 disposed on the upper surface of the two side parts. These triple prism columns 81 are perpendicular to the length direction and are arranged parallel to each other. These triple prism columns 81 each have a base part facing downwards and connected to each other at the upper surface of the light uniformization plate 17. The apex angle opposite to the base part faces upwards.

In an example, there are three triple prism columns 81 located on each side of the light uniformization plate 17. The most inside triple prism column 81 (i.e., the closest to the LED chip 15) has an apex angle of (180-C) degrees, where C is the degree of the critical angle of total reflection. The most outside triple prism column 81 (i.e., the farthest from the LED chip 15) has an apex angle of 90 degrees. The pex angles of these triple prism columns 81 decrease in an equidifferent manner along the direction away from the LED chip 15 (i.e., form inside to outside). In other words, the difference values between the apex angles of adjacent triple prism columns 81 are the same. For example, in the case where a light uniformization plate 17 is formed of polyethylene, C=43°. If there are four triple prism columns 81 formed on each side of the light uniformization plate 17, the apex angles of the four triple prism columns 81 are 137°, 121.4°, 105.7° and 90°, successively, form inside to outside. In other words, all the difference values between the apex angles of adjacent triple prism columns 81 are 15.7°.

Figure 7:
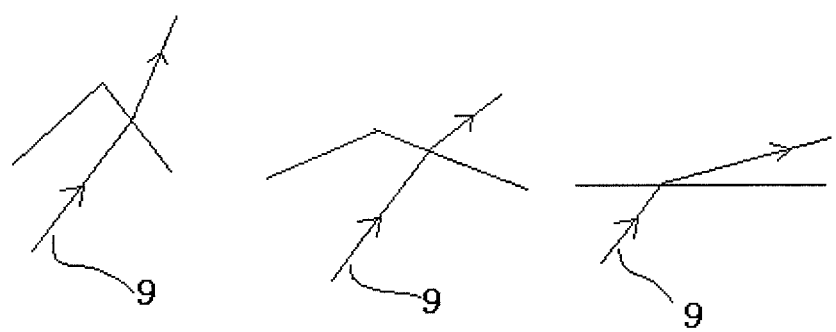
FIG. 7 is a schematic view showing light uniformization mechanism of the triple prism column of the LED package unit in the first embodiment of the disclosed technology.

As shown in FIG. 7, taking the triple prism columns 81 on the right side part of the LED chip 15 for example, the right side surface of the triple prism columns 81 can decrease the incident angles of light rays 9, compared with the case where light exits from a horizontal surface. Therefore, the exiting light rays 9 are converged to the central part of the light emitting diode package unit (i.e., the location of the LED chip 15); on the other hand the reflection of the light rays 9 are suppressed. At the same time, a portion of the light rays 9, which would be totally reflected without the triple prism columns, can exit for illuminating. As a result, the triple prism columns 81 can improve the uniformity of the exiting light and the overall brightness of the light emitting diode package unit. In addition, the left surface of the triple prism columns 81 would make the light divergent; however, area irradiated by light within the left surface is much smaller than that within the right side surface, so the light diverged by the left side surface is far less than the light converged by the right side surface.

Second Embodiment

Figure 8:
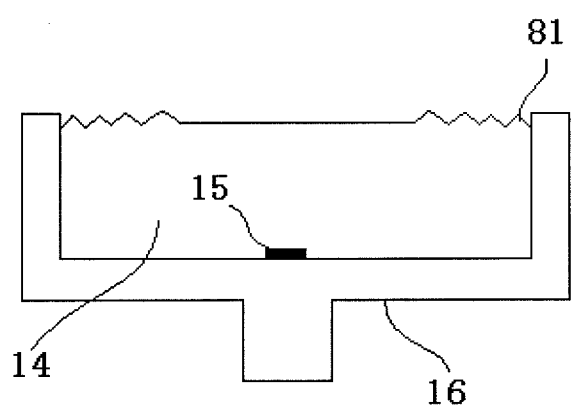
FIG. 8 is a structural schematic cross-sectional view showing a light emitting diode package unit in a second embodiment of the disclosed technology.

As shown in FIG. 8, an embodiment of the disclosed technology provides a light emitting diode package unit whose structure is similar to the structure of the LED package unit in the first embodiment. The difference lies in that in the LED package unit of the second embodiment, there is not provided a light uniformization plate 17, but the triple prism columns 81 are directly formed on the two side parts along the length direction of the upper surface of the package element 14.

Third Embodiment

Figure 9:
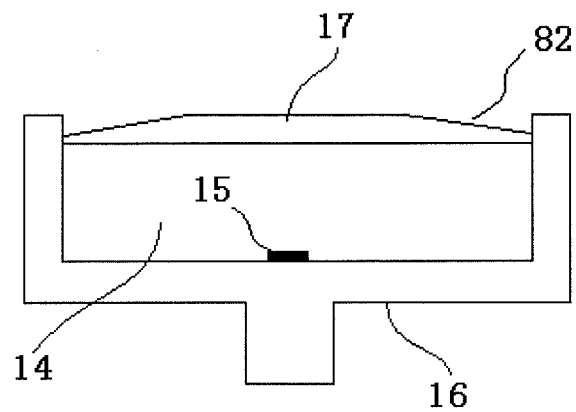
FIG. 9 is a structural schematic cross-sectional view showing a light emitting diode package unit in a third embodiment of the disclosed technology.
Figure 10:
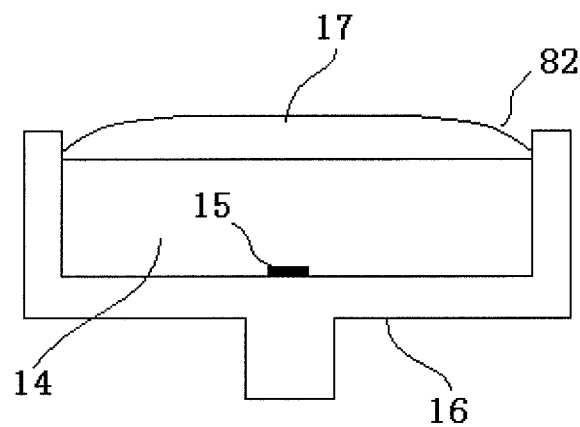
FIG. 10 is a structural schematic cross-sectional view showing another light emitting diode package unit in an embodiment of the disclosed technology.
Figure 11:
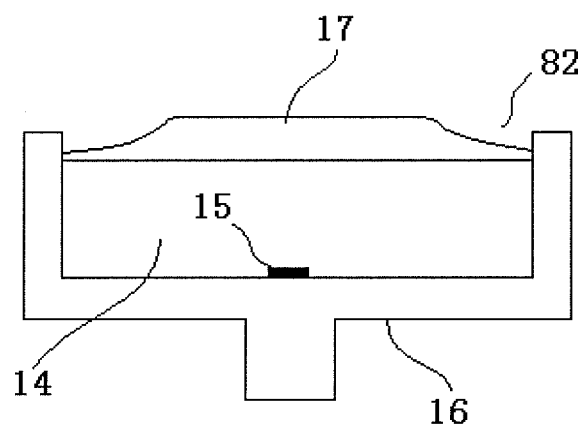
FIG. 11 is a structural schematic cross-sectional view showing another light emitting diode package unit in an embodiment of the disclosed technology

As shown in FIG. 9, FIG. 10 and FIG. 11, respectively, an embodiment of the disclosed technology provides a LED package unit, the structure of which is similar to the structure of the LED package unit in the first embodiment. The difference lies in that in the LED package unit of the second embodiment, light uniformization surface parts 82 instead of the triple prism columns are formed on two side parts along the length direction of the upper surface of the light uniformization plate. The light uniformization surface parts 82 extend downwards from the central part to the side parts along the length direction. In particular, the light uniformization surface parts 82 can be a planar surface (see FIG. 9), a convex surface (see FIG. 10), a concave surface (see FIG. 11), or the like (e.g., the combination of various types of surface).

The light uniformization surface parts 82 function as the right side surfaces of the triple prism columns 81 on the right side part in the first embodiment. Thus, the light uniformization surface parts can improve the uniformity of the exiting light and the overall light brightness of the light emitting diode package unit.

Fourth Embodiment

Figure 12:
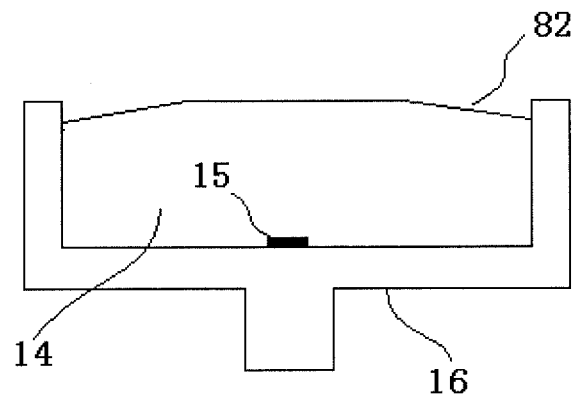
FIG. 12 is a structural schematic cross-sectional view showing a light emitting diode package unit in a fourth embodiment of the disclosed technology.

As shown in FIG. 12, an embodiment of the disclosed technology provides a LED package unit, the structure of which is similar to the structure of the LED package unit in the third embodiment. The difference lies in that in the LED package unit of the fourth embodiment, there is no light uniformization plate 17, and the light uniformization surface parts 82 are directly formed on the two side parts along the length direction of the upper surface of the package element 14.

Figure 1:
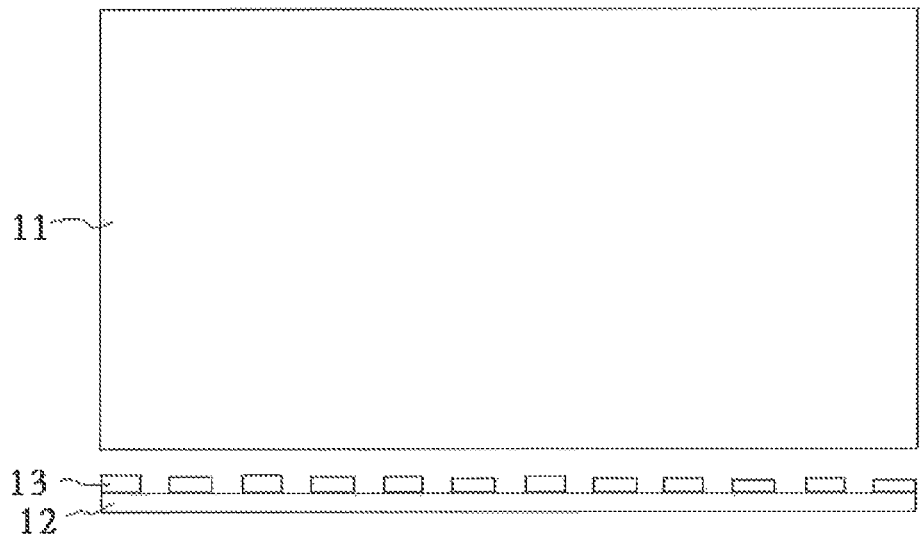
FIG. 1 is a structural schematic view of a conventional backlight.
Figure 2:
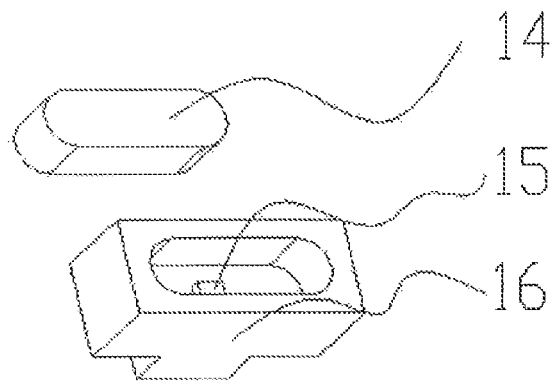
FIG. 2 is a structural schematic view of a conventional LED package unit.
Figure 3:
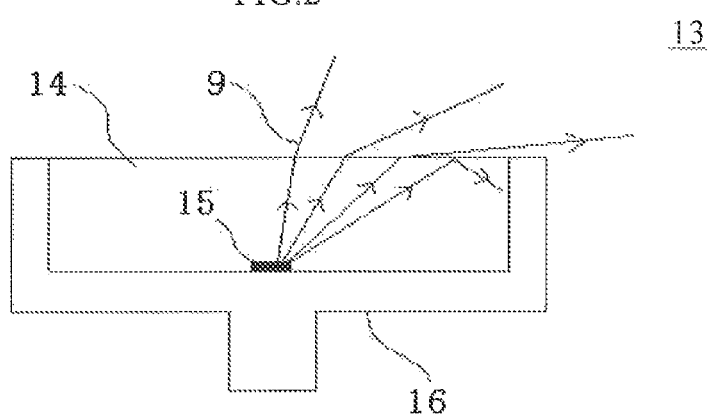
FIG. 3 is a partial light path view of a LED package unit of a related art.
Figure 4:
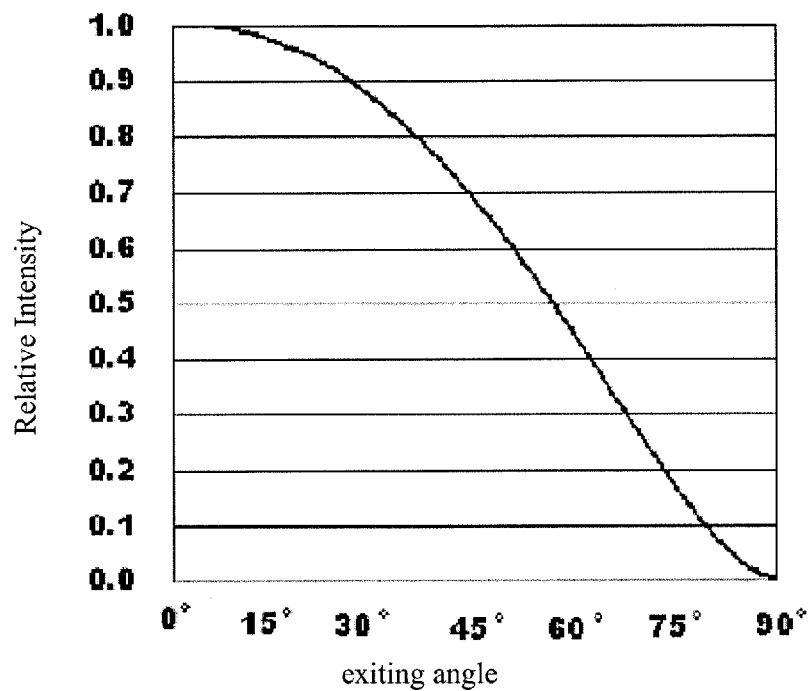
FIG. 4 is a curve diagram showing the relationship between the exiting angle and the relative intensity in a LED package unit of a related art.

Since the exiting light from the central part of the LED package unit is bright and uniform, no light uniformization structure is needed for the central part. Preferably, the exiting angle of the light at the most inside light uniformization structure (i.e., the closest to the LED chip 15) is about 50°~55°. In other words, the most inside light uniformization structure is provided on a position corresponding to the relative intensity of 0.5 in FIG. 4, or the angle between the line, which connects the position and the light emitting chip, and the vertical direction is about 30°~35°.

Fifth Embodiment

Figure 13:
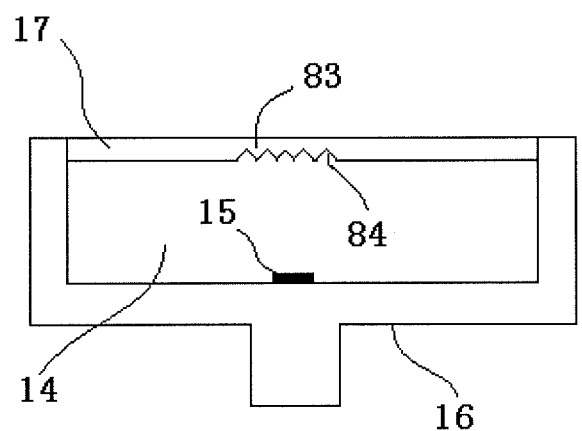
FIG. 13 is a structural schematic cross-sectional view showing a light emitting diode package unit in a fifth embodiment of the disclosed technology.
Figure 14:
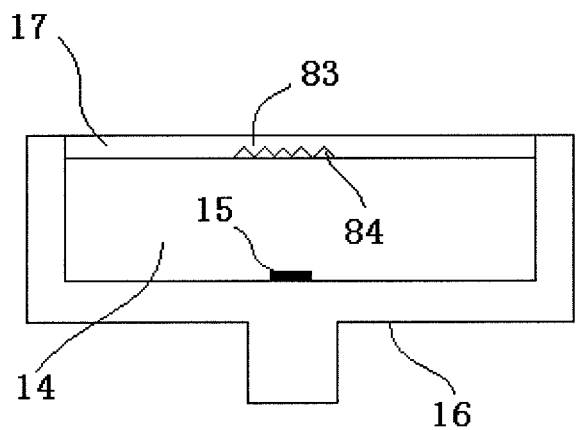
FIG. 14 is a structural schematic cross-sectional view showing another light emitting diode package unit in an embodiment of the disclosed technology.

An embodiment of the disclosed technology provides a LED package unit, as shown in FIG. 13 and FIG. 14, which comprises: a light extraction cup 16, a LED chip 15, a package element 14, and a light uniformization plate 17. There are several triple prism columns (i.e., light uniformization structures) 83 provided on the central part of the lower surface of the light uniformization plate 17. These triple prism columns 83 are perpendicular to the length direction and are arranged parallel to each other. These triple prism columns 83 each have a base part facing upwards and connected to each other at the lower surface of the light uniformization plate 17. The apex angle opposite to the base part faces downwards. A Void 84 between any two of these triple prism columns 83 is a projection on the package element 14 as shown in FIG. 13. Here, the refractive index of the package element 14 is preferably smaller than that of the light uniformization plate 17, since the projections on the package element 14 can also function as the triple prism columns and will reduce the centralization effect of the triple prism columns 83. Voids 84 among these triple prism columns 83 may also be filled with air as shown in FIG. 14.

Compared with the first embodiment, one of the two surfaces of the triple prism column 83 can be used to diverge the exiting light from the central part. Thus, the exiting light from the LED package unit is overall uniform. Similar to the first embodiment, the other surface may function as a condenser; however, the influence of the other surface can be ignored.

Obviously, various modifications can be made to the LED package unit according to the embodiments of the disclosed technology. For example, the arrangement direction of the triple prism columns may be modified (e.g., a direction which deviates from the length direction); the relative position relationship between the light uniformization structures and the surface of the light uniformization plate or the package element may also be modified. For example, the light uniformization structures may be higher than the upper surface of the central part as shown in FIG. 6, or the light uniformization structures may be lower than the upper surface of the central part as shown in FIG. 8. If the overall shape of the light emitting diode package unit is changed, so does the form of the light uniformization structure. For example, for a light emitting diode package unit with a cylinder package element, light uniformization structures may be distributed around the central portion; for a light emitting diode package unit with a light emitting diode package unit not in the center, light uniformization structures may be distributed asymmetrically; The side surface of the triple prism column may be a curved surface. A plurality of light uniformization structures which are even more smaller, such as tiny triple prism columns, may be provided on the side surface of the triple prism column. The light uniformization structures for converging the light from the side parts and the light uniformization structures for diverging the light from the central part can be simultaneously used. The respective components may be formed of different materials; etc.

Sixth Embodiment

Figure 15:
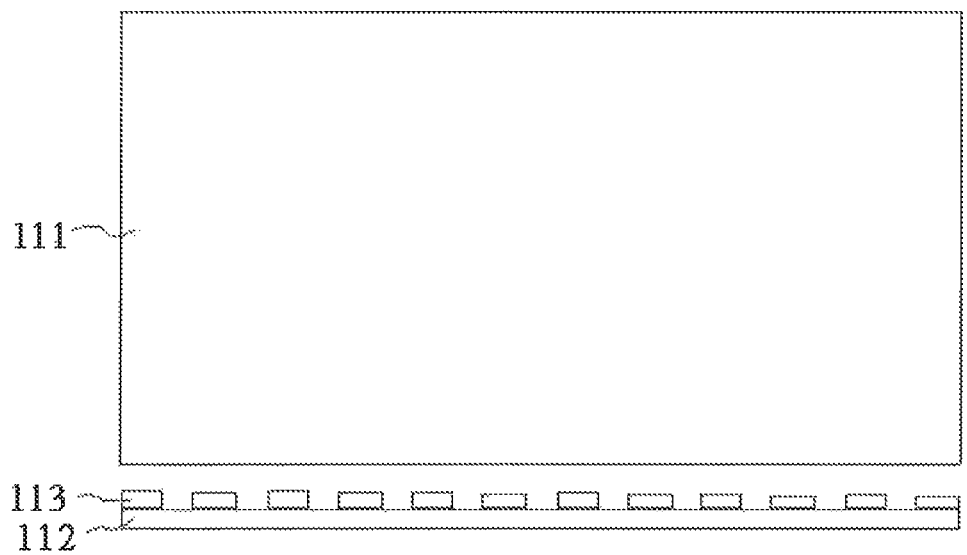
FIG. 15 is a structural schematic view showing a backlight in the sixth embodiment of the disclosed technology.

An embodiment of the disclosed technology provides a backlight, as shown in FIG. 15, which comprises: a light guide plate 111, and at least two LED package units 113 disposed on one side of the light guide plate 111, wherein at least one of the at least two LED package units 113 is the LED package unit 13 described above.

In addition, the backlight in this embodiment further comprises some common components in a backlight, such as a circuit board 112, a lamp cover, a frame, a polarizing plate, a brightness enhancement plate; a reflective layer, and so on.

Since one of the above-mentioned LED package units is used in the backlight of this embodiment, the exiting light from the upper surface of the light guide plate can become uniform, and the display quality of the liquid crystal display which adopts the backlight is improved. On the other hand, since the overall brightness of the light emitting diode package unit of the backlight increases, the distance between the respective LED package units may be enlarged. Therefore, fewer LED package units are need, which result in a low cost and energy saving.

Obviously, besides the backlight of liquid crystal display, the LED package units can be used in other devices, such as a light, an instrument panel, a indicating lamp, a projecting apparatus, and so on.

An embodiment of the disclosed technology provides a method for manufacturing a backlight, comprising:

Step 01: fixing a LED chip;

Step 02: packaging the LED chip with a packaging material; and

Step 03: forming a light uniformization structure above the LED chip.

Due to the step of forming a light uniformization structure, the resultant LED package unit has an improved light uniformity.

Seventh Embodiment

An embodiment of the disclosed technology provides a method for manufacturing a LED package unit, comprising:

Step 11: expanding the spaces between dies for LED chips after a dicing process;

Step 12: fixing each of the LED chips onto the bottom of a light extraction cup;

Step 13: introducing a packaging material such as epoxy resin containing fluorescent granules into the light extraction cup to packaging the LED chip;

Step 14: placing a light uniformization plate with a light uniformization structure of the first, third or fifth embodiment onto the packaging material, at a proper temperature (measured by a temperature sensor) which is higher than the curing temperature of the packaging material, wherein the light uniformization plate may be formed of polythene, and the light uniformization structure can be formed by molding in process of forming the light uniformization plate, or the light uniformization structure can be formed by processes such as machining after the light uniformization plate is formed.

Step 15: curing the package element material by ultraviolet irradiation (UV irradiation) and bonding the light uniformization plate with the packaging material (i.e., package element).

Obviously, there are various modifications of the method for manufacturing the light emitting diode package unit. For example, the light uniformization plate is bonded onto the packaging material via glue, after curing the packaging material; or a planar light uniformization plate is first connected onto the packaging material and then the light uniformization structure is formed on the light uniformization plate by processes such as machining.

Eighth Embodiment

An embodiment of the disclosed technology provides a method for manufacturing a light emitting diode package unit, comprising:

Step 21: expanding the spaces between dies for LED chips after a dicing process;

Step 22: fixing each the LED chips onto the bottom of a light extraction cup;

Step 23: introducing a packaging material such as epoxy resin containing fluorescent granules into the light extraction cup, so as to package the LED chip;

Step 24: forming the light uniformization structure of the second or the fourth embodiment onto the upper surface of the packaging material, wherein the light uniformization structure may be formed by various methods. For example, a mold is provided onto the upper surface of the packaging material before a curing process, and then the light uniformization structure can be formed before the curing process; or the light uniformization structure can be formed by processes such as machining after the packaging material being cured.

The disclosed technology being thus described, it will be obvious that the same may be varied in many ways. Such variations are not to be regarded as a departure from the spirit and scope of the disclosed technology, and all such modifications as would be obvious to those skilled in the art are intended to be comprised within the scope of the following claims.

What is claimed is:

1. A light emitting diode (LED) package unit, comprising:
   a LED chip; and
   a light uniformization structure, formed above the LED chip in a direction of exiting light,
   wherein the light uniformization structure is only provided on a periphery part of the light emitting diode package unit but not provided in a center planar part inside the periphery part of the light emitting diode package unit, and the light uniformization structure is configured for converging light exiting from two side parts along a length direction of the light emitting diode package unit,
   wherein at least three triple prism columns which are arranged parallel to each other are disposed on each of the two side parts along the length direction of the LED chip and above the LED chip, the apex angle of the triple prism columns on one of the two side parts decrease in an equidifferent manner in a direction of leaving the LED chip;
   a base part of each triple prism column faces downwards and an apex angle opposite to the base part faces upwards, and the triple prism columns are perpendicular to the length direction of the LED chip and are arranged parallel to each other.

2. The light emitting diode package unit according to claim 1, further comprising a package element covering and surrounding the LED chip for packaging the LED chip, wherein the light uniformization structure is directly formed on an upper surface of the package element.

3. The light emitting diode package unit according to claim 2, wherein the package element comprises epoxy resin.

4. The light emitting diode package unit according to claim 1, further comprising:
   a package element covering and surrounding the LED chip for packaging the LED chip; and
   a light uniformization plate on the package element,
   wherein the light uniformization structure is formed on an upper surface of the light uniformization plate.

5. The light emitting diode package unit according to claim 4, wherein the package element comprises epoxy resin.

6. The light emitting diode package unit according to claim 4, wherein the light uniformization plate is formed of polythene.

7. The light emitting diode package unit according to claim 1, wherein among the triple prism columns on one of the two side parts, the triple prism column closest to the LED chip has an apex angle of (180-C) degrees, and the triple prism column farthest from the LED chip has an apex angle of 90 degrees, where C is a critical angle of a material adopted to form the triple prism column.

8. The light emitting diode package unit according to claim 1, wherein an angle between a line connecting a position of the light uniformization structure closest to the LED chip with the LED chip and a vertical direction is in a range from 30 degrees to 35 degrees.

9. A backlight, comprising:
   a light guide plate, and
   at least two LED package units disposed on one side of the light guide plate,
   wherein the at least two LED package units comprise the light emitting diode package unit according to claim 1.

10. A method for manufacturing a backlight, comprising:
    fixing a LED chip;
    packaging the LED chip with a packaging material; and
    forming a light uniformization structure above the LED chip in a direction of exiting light,
    wherein the light uniformization structure is only provided on a periphery part of the light emitting diode package unit but not provided in a center planar part inside the periphery part of the light emitting diode package unit, and the light uniformization structure is configured for converging light exiting from two side parts along a length direction of the light emitting diode package unit,
    wherein at least three triple prism columns which are arranged parallel to each other are disposed on each of the two side parts along the length direction of the LED chip and above the LED chip, the apex angle of the triple prism columns on one of the two side parts decrease in an equidifferent manner in a direction of leaving the LED chip;
    a base part of each triple prism column faces downwards and an apex angle opposite to the base part faces upwards, and the triple prism columns are perpendicular to the length direction of the LED chip and are arranged parallel to each other.

11. The method according to claim 10, wherein the step of forming a light uniformization structure above the LED chip in a direction of exiting light comprises:
    placing a light uniformization plate on the packaging material before curing the packaging material; and
    curing the packaging material, so as to bond the light uniformization plate with the packaging material.

* * * * *